Patented Oct. 19, 1948

2,451,748

UNITED STATES PATENT OFFICE 2,451,748

OXIDATION INHIBITOR FOR FATS AND OILS

Henry R. Kraybill and Buell W. Beadle, Chicago, Ill., assignors, by mesne assignments, to A. W. Brickman, Victor Conquest, Frank J. Madden, Wrisley B. Oleson, and Emery T. Filbey, all of Chicago, Ill., as trustees for the benefit of American Meat Institute Foundation No Drawing. Application June 20, 1945,
Serial No. 600,647

6 Claims. (Cl. 99—163)

This invention relates to the inhibition of the oxidation of fats, oils and compositions, particularly food products, containing the same. The fats and oils referred to herein are those comprising glycerides of fatty acids, more particularly unsaturated fatty acids. While our invention is mainly concerned with oils and fats of animal origin and materials which contain or include them and more specifically is directed to the preservation of lard, the invention may be applied to oils and fats not only of animal origin but of vegetable origin or from synthetic sources.

It is well known that this class of substances tends by oxidation to become rancid in greater or less time, depending upon conditions of temperature, exposure to oxidation, the presence of impurities and other influences. Also the time within which the transformation from a satisfactory to an unsatisfactory product occurs depends in large degree upon the composition and nature of the specific oil or fat or other product under consideration.

Various attempts have heretofore been made to provide anti-oxidants as an addition to the materials above referred to in which oxidation is to be inhibited. A primary requirement of any satisfactory inhibitor is the preservation of the character of the original material with minimum change in taste, odor, color or appearance. Such addition as may be made for this purpose should add as little as possible to the cost in view of the close margin on which most of these materials are handled. Also it is desirable to add as little foreign matter as possible to any such material, particularly if it is of edible character.

Our invention proceeds on the basis of the addition of two or more materials, each in very minute amounts, but operating together to exert a so-called synergistic effect in respect of inhibiting oxidation in materials of the above class.

We have discovered that by a suitable combination of two addition agents each in fractions of a per cent. the stability of a treated product, such as lard, may be increased enormously as much as 40 to 60 times the normal keeping time.

In the preferred practice of our invention, we employ as the synergistic agents, nordihydroguaiaretic acid, more specifically, beta, gamma-dimethyl-alpha, delta-bis (3,4-dihydroxyphenyl), (said acid is designated herein by the commonly used abbreviation NDGA), and phosphoric acid, more particularly ortho-phosphoric acid, $H_3PO_4$, both in exceptionally low concentration, i. e., small fractions of a per cent.

The qualities of NDGA alone, i. e., without other agents for the preservation of oleaginous materials, particularly lard, tallow, grease, butterfat, edible oils, and edible hydrogenated animal and vegetable oils commonly used for food stuffs are disclosed in Patent No. 2,373,192. According to the said disclosure, the NDGA, when used in amounts ranging from .001% to 0.1% increases the stability factor from about three to seventeen times.

The employment of phosphoric acid as an antioxidant for edible oils and fats is disclosed in Patent No. 1,993,152. According to that disclosure, the addition to fats of phosphoric acid or its equivalent in the form of acid salt or ester from .01% down to as low as .0001% gave favorable results. In general, additions of .01% increased the stability by a factor of from two and one-half to three, that is, the treated products were found to be from two and one half to three times as resistant to oxidation as the untreated materials.

It is our discovery that through the combined synergistic effect of NDGA and phosphoric acid, the stability factor may be very greatly increased, far beyond the possibility of either of these materials alone. In tests which we have run to determine the effect of NDGA and phosphoric acid, singly and in combination on the stability of lard, we find that with phosphoric acid of .01% and NDGA in from .001% to .01%, the stability factor runs from 8 to 42.3. That is to say, by the addition of the foregoing percentages of NDGA and of phosphoric acid, the time during which the lard is stable as tested by the active oxygen method is from 8 to 42.3 times as great as that of the untreated lard. In other tests, we find that employing .10% of phosphoric acid with NDGA in percentages running from .001% to .01% the stability factor is from 15.7 to 60.3 times that of the untreated lard. The aforesaid tests were made on a lard having the relatively low stability of three hours when untreated.

In lard of a somewhat higher stability, the percentage increase in keeping qualities of, for example, four or five hours, is not so high as above referred to, but in the low percentages which we employ is still many times greater than that of any known anti-oxidant in similar concentrations.

NDGA is, when pure, a crystalline solid. It may be obtained as a synthetically produced product, or it may be obtained from a natural source. Its characteristics and properties are recited in "Oil and soap," February 1944 issue, vol. XXI, No. 2, page 33.

NDGA may be employed as an anti-oxidant in medicinal and pharmaceutical preparations constituted in part of an oil or fat, such as lard, lanolin, corn oil and the like, and phosphoric acid may be used in the same or similar materials.

The use of the two together in the aforesaid substances, in accordance with our invention, is unobjectionable from the standpoint of taste, odor, color or change in color, or any of the usual qualities in which addition agents may offend, and the combined use of the two, in the proportions herein referred to, secures vastly increased keeping qualities of the product.

The method of introducing the NDGA and phosphoric acid into the lard or other fat or oil to be treated offers no difficulty. Each ingredient may be separately added, or they may be mixed together in the desired amounts to secure the proper percentages and added to the lard in molten condition, which is then stirred. Both NDGA and phosphoric acid form a solution with ethyl or other alcohols and the ingredients may be thus added as a liquid to the melted lard. The introduction of the addition materials may be varied, the above being merely illustrative.

The method of testing for the development of rancidity is in accordance with the so-called active oxygen method which consists in blowing air through the melted lard while holding the temperature thereof at 98½° C., approximately the temperature of boiling water.

The following Table I reports the effect of NDGA and phosphoric acid, singly and in combination on the stability of lard, tested according to the active oxygen method of testing. It shows the stability of a control sample, No. 131, to be three hours, and it indicates the keeping qualities of the lard for the addition of .01% of phosphoric acid, and varying amounts of NDGA from .001% to .01% of NDGA.

All figures of percentages are in terms of weights of the respective ingredients.

*Table I*

| Sample | Per cent NDGA | Per cent H₃PO₄ | Stability, hours | Stability Factor |
|---|---|---|---|---|
| 131 | | | 3 | |
| 155 | | .01 | 10 | 3.3 |
| 132 | .001 | | 5 | 1.7 |
| 133 | .0025 | | 10 | 3.3 |
| 134 | .005 | | 27 | 9.0 |
| 135 | .010 | | 33 | 11.0 |
| 136 | .001 | .01 | 24 | 8.0 |
| 137 | .0025 | .01 | 49 | 16.3 |
| 138 | .005 | .01 | 79 | 26.3 |
| 139 | .010 | .01 | 127 | 42.3 |
| 140 | .001 | .10 | 47 | 15.7 |
| 141 | .0025 | .10 | 69 | 23.0 |
| 142 | .005 | .10 | 83 | 27.7 |
| 143 | .010 | .10 | 181 | 60.3 |
| 188 | | | 3 | |
| 182 | | .01 | 8 | 2.7 |
| 183 | | .10 | 19 | 6.3 |
| 184 | .001 | | 14 | 4.7 |
| 185 | .0015 | | 20 | 6.6 |
| 186 | .0025 | | 27 | 9.0 |
| 187 | .005 | | 42 | 14.0 |
| 190 | | | 4 | |
| 191 | | .01 | 9 | 2.2 |
| 192 | .001 | .01 | 27 | 6.8 |
| 193 | .0015 | .01 | 45 | 11.2 |
| 194 | .0025 | .01 | 50 | 12.5 |
| 195 | .005 | .01 | 83 | 20.7 |
| 196 | | | 5 | |
| 197 | .001 | .10 | 50 | 10.0 |
| 198 | .0015 | .10 | 68 | 13.6 |
| 199 | .0025 | .10 | 94 | 18.8 |

The increase by the addition of the aforesaid amount of phosphoric acid raises the stability factor to 3.3, and the addition of various amounts of NDGA up to .01% raises the stability factor to 11.0. But the two ingredients, through their synergistic effect, vastly increased the stability factor. Thus, by introducing phosphoric acid in amount of substantially .01% and NDGA in amount of from .001% to .01% by weight of the total, the stability factor was raised to a maximum of 42.3.

In a further experiment upon the same sample of lard, the phosphoric acid was raised to .10% and the NDGA varied as before from .001% to .01%. The stability factor was raised to a maximum of 60.3. So large a percentage of phosphoric acid is generally not desirable as it will darken the lard.

In the remainder of Table I, tests were made in Samples 182 and 183 to compare the effect of increasing the addition of phosphoric acid from .01% to .1% compared with a control sample No. 188 having a stability of three hours. The larger amount of phosphoric acid alone gave a stability factor of 6.3.

The tests of Samples 184 to 187, NDGA in percentages of from .001% to .005%, as compared to control Sample No. 188, showed a range of stability factor from 4.7 to 14.0.

Tests run on Samples 190 to 195 on a lard having a stability of four hours showed that with phosphoric acid present in .01% and NDGA present in .005% a stability factor of 20.7 was attained.

In another run of Samples 196 to 199, the phosphoric acid was increased to .1% and the NDGA varied from .001% to .0025% to determine the effect of variation in the other direction, and a maximum stability factor of 18.8% was secured in Sample 199. From the above tests of Table No. I, it can be seen that the increase in stability factor using 0.1% of phosphoric acid and from .005% to .010% NDGA a stability factor of from 20 to 40 as compared to the control sample may be obtained.

With phosphoric acid present in .10% and NDGA varied from .001% to .010%. the stability factor runs from 10 to 60.3% for various samples.

In another series of tests, tabulated below in Table II, various materials were treated singly with phosphoric acid and with NDGA respectively, and then tested with the combination of the two ingredients. The oleo stock of Samples 231 to 234 showed an increase separately for each of the ingredients but a very remarkable increase for the two ingredients together producing their synergistic effect. The results were equally pronounced in respect of the edible tallow of Samples 235 to 238 inclusive. While the increase by the use of the combined effect of the two ingredients, phosphoric acid and NDGA, are not so pronounced in respect of fancy tallow, mutton tallow and choice grease, below tabulated, it is nevertheless so marked as to establish a vast and unexpected value in treatment of the stock by the two ingredients jointly.

*Table II*

| Sample | | Antioxidant | | Hrs. | |
|---|---|---|---|---|---|
| | | NDGA | H₃PO₄ | A | B |
| | | Per cent | Per cent | | |
| 231 | Oleo Stock | | | 16 | 17 |
| 232 | do | | .010 | 35 | 37 |
| 233 | do | .0015 | | 57 | 56 |
| 234 | do | .0015 | .010 | >209 | >208 |
| 235 | Edible Tallow | | | 13 | 13 |
| 236 | do | | .010 | 13 | |
| 237 | do | .0015 | | 49 | 48 |
| 238 | do | .0015 | .010 | 105 | 104 |
| 239 | Fancy Tallow | | | 13 | 12 |
| 240 | do | | .010 | 13 | 12 |
| 241 | do | .0015 | | 26 | 25 |
| 242 | do | .0015 | .010 | 37 | 36 |
| 243 | Mutton Tallow | | | 2 | 2 |
| 244 | do | | .010 | 3 | 3 |
| 245 | do | .0015 | | 11 | 11 |
| 246 | do | .0015 | .010 | 16 | 16 |
| 251 | Choice Grease | | | 4 | 3 |
| 252 | do | | .010 | 3 | 3 |
| 253 | do | .0015 | | 4 | 4 |
| 254 | do | .0015 | .010 | 11 | 9 |

The addition to lard of phosphoric acid in amounts of about .02% or over darkens it and is generally undesirable. There may, however, be situations where color of the product is not important. It is a virtue of our invention that by the combined effect of the two aforesaid ingredients a great increase in stability may be secured within the limits of .01% of phosphoric acid.

It is a further virtue of our invention that even with the low concentrations of NDGA and of phosphoric acid, i. e., in amounts not exceeding a minor fraction of a per cent. respectively, the rancidity inhibiting effect is not disturbed by deodorizing of the lard. Because of this property the anti-oxidants as per our invention may be added before deodorization or thereafter. Deodorization is generally performed by passing steam at reduced pressure (6 mm. of mercury) through the hot lard (200° C.) in the amount of about 5 gr. of steam per 100 gr. of lard. So treated it is called bland lard. The result of tests made to determine the effectiveness of the introduction of the anti-oxidants as per our invention before deodorizing and after, respectively, are recorded in Table III below.

Table III

| Sample No. | Antioxidants, per cent | Stability, AOM, hrs. |
|---|---|---|
| 6 N[1] | None | 5 |
| 7 N | NDGA, 0.0015 / Phosphoric acid, 0.01 | 36 |
| 8 N | NDGA, 0.0025 / Phosphoric acid, 0.01 | 54 |
| 6 D[2] | See 6 N | 5 |
| 7 D | See 7 N | 39 |
| 8 D | See 8 N | 56 |

[1] N means not deodorized.
[2] D means deodorized after addition of antioxidants.

The testing for rancidity on the above trials in Table II and Table III was performed by the oxygen method in the same manner as referred to in the tests tabulated in Table I.

We claim:

1. A material normally subject to the deteriorating effect of oxidative rancidity due to its content of a compound of the group consisting of fatty acids and glycerides of fatty acids containing a fractional percentage of NDGA ranging from .001% to .01% and phosphoric acid in a quantity not exceeding .02%.

2. A material normally subject to the deteriorating effect of oxidative rancidity due to its content of a compound of the group consisting of fatty acids and glycerides of fatty acids containing NDGA in amount not in excess of .01% and phosphoric acid in amount not exceeding substantially .10%.

3. Lard containing a fractional percentage of NDGA ranging from .001% to .01% and a fractional percentage of phosphoric acid in amount not to exceed substantially .02%.

4. A fatty material having incorporated therein NDGA and phosphoric acid as antioxidant ingredients in amounts ranging from .001% to .010% of the former and from .01% to .02% of the latter.

5. Process of stabilizing by synergesis a material normally subject to the deteriorating effect of oxidative rancidity due to its content of a compound of the group consisting of fatty acids and glycerides of fatty acids consisting in the introduction into said fatty material of NDGA and phosphoric acid in quantities such that the content of NDGA in the treated fatty material is from .001% to .01% and the content of phosphoric acid in the treated fatty material is substantially .01%.

6. Process of stabilizing lard by synergesis which consists in adding to the lard an alcohol solution of NDGA and phosphoric acid to bring the NDGA content of the lard to a value of from .001% to .01% and the phosphoric acid content to a value of substantially .01%.

HENRY R. KRAYBILL.
BUELL W. BEADLE.

REFERENCES CITED

The following references are of record in the file of this patent:

UNITED STATES PATENTS

| Number | Name | Date |
|---|---|---|
| 1,993,152 | Eckey | Mar. 5, 1935 |
| 2,104,242 | Richardson | Jan. 4, 1938 |
| 2,314,365 | Musher | Mar. 23, 1943 |
| 2,333,657 | Mattill et al. | Nov. 9, 1943 |
| 2,373,192 | Lauer | Apr. 10, 1945 |

OTHER REFERENCES

Rancidity in Edible Fats, Lea, 1938, pages 37, 38 and 47.